US011729281B2

(12) United States Patent
Clark et al.

(10) Patent No.: US 11,729,281 B2
(45) Date of Patent: Aug. 15, 2023

(54) CALIBRATION DATA TRANSMISSIONS (71) Applicant: Hewlett-Packard Development Company, L.P., Houston, TX (US)

(72) Inventors: Alexander Wayne Clark, Houston, TX (US); Richard E. Hodges, Magnolia, TX (US); Kent E. Biggs, Tomball, TX (US)

(73) Assignee: Hewlett-Packard Development Company, L.P.

( * ) Notice: Subject to any disclaimer, the term of this patent is extended or adjusted under 35 U.S.C. 154(b) by 0 days.

(21) Appl. No.: 16/066,413

(22) PCT Filed: Mar. 28, 2016

(86) PCT No.: PCT/US2016/024513
§ 371 (c)(1),
(2) Date: Jun. 27, 2018

(87) PCT Pub. No.: WO2017/171710
PCT Pub. Date: Oct. 5, 2017

(65) Prior Publication Data
US 2019/0007504 A1 Jan. 3, 2019

(51) Int. Cl.
*H04L 67/52* (2022.01)
*H04W 4/029* (2018.01)
(Continued)

(52) U.S. Cl.
CPC .............. *H04L 67/52* (2022.05); *G06F 3/038* (2013.01); *H04L 12/1827* (2013.01);
(Continued)

(58) Field of Classification Search
CPC . H04L 67/18; H04L 12/1827; H04L 65/1003; H04L 67/52; H04L 65/1101; H04W 4/029; H04W 4/80; H04W 4/50
See application file for complete search history.

(56) References Cited

U.S. PATENT DOCUMENTS 7,656,396 B2 * 2/2010 Bosch ................. G06F 3/03545
345/156
8,171,137 B1 * 5/2012 Parks .................... H04L 69/329
709/224
(Continued)

FOREIGN PATENT DOCUMENTS

CN 102017515 4/2011
CN 102714780 A * 10/2012 .............. H04W 4/06
(Continued)

OTHER PUBLICATIONS

Thinkpad Tablet 2 and Helix (type 3xxx) Pen Calibration Procedure, Downloaded from the Internet on Feb. 4, 2016, 4 pages, Available at: https://support.lenovo.com/us/en/documents/ht07.

*Primary Examiner* — William G Trost, IV
*Assistant Examiner* — Monishwar Mohan
(74) *Attorney, Agent, or Firm* — Quarles & Brady LLP (57) ABSTRACT Example implementations relate to calibration data transmissions. For example, a computing device includes a storage device to store calibration data of an electronic device coupled to the computing device. The computing device also includes a network interface to establish a network connection with a second computing device. The computing device further includes a processor to automatically transmit, via the network connection, the calibration data to the second computing device based on a location of the second computing device relative to the computing device and based on an association with second computing device via a communication session.

16 Claims, 4 Drawing Sheets

(51) Int. Cl.
*H04W 4/02* (2018.01)
*H04W 4/80* (2018.01)
*H04W 4/50* (2018.01)
*G06F 3/038* (2013.01)
*H04L 65/1101* (2022.01)
*H04L 12/18* (2006.01)
*H04L 65/1069* (2022.01)

(52) U.S. Cl.
CPC ...... *H04L 65/1069* (2013.01); *H04L 65/1101* (2022.05); *H04W 4/023* (2013.01); *H04W 4/029* (2018.02); *H04W 4/50* (2018.02); *H04W 4/80* (2018.02)

(56) References Cited

U.S. PATENT DOCUMENTS

| | | | |
|---|---|---|---|
| 8,559,575 | B2 | 10/2013 | Ananny et al. |
| 8,676,119 | B2 * | 3/2014 | Cohen ............... H04W 8/186 455/41.1 |
| 9,088,542 | B2 * | 7/2015 | Modai ................ H04W 12/37 |
| 2004/0012573 | A1 * | 1/2004 | Morrison ............. G06F 3/042 345/173 |
| 2007/0123166 | A1 * | 5/2007 | Sheynman ......... H04M 1/7253 455/41.2 |
| 2008/0198781 | A1 * | 8/2008 | Rajakarunanayake ...................... H04L 12/2856 370/310 |
| 2009/0271848 | A1 * | 10/2009 | Leung ................. H04L 67/75 709/225 |
| 2009/0298440 | A1 * | 12/2009 | Takeya ................. H04B 1/40 455/67.14 |
| 2010/0049596 | A1 * | 2/2010 | Frank ................. G06Q 10/00 705/321 |
| 2010/0167643 | A1 * | 7/2010 | Hirsch ................ H04L 63/18 455/41.1 |
| 2011/0296352 | A1 | 12/2011 | Lobb |
| 2011/0320165 | A1 * | 12/2011 | Miyamoto ........... G06F 3/0354 702/150 |
| 2013/0124741 | A1 * | 5/2013 | Karaoguz ......... H04L 63/0492 709/228 |
| 2013/0125016 | A1 * | 5/2013 | Pallakoff ........... G06F 3/04817 715/748 |
| 2014/0062863 | A1 * | 3/2014 | Yu ..................... G06F 3/0418 345/156 |
| 2014/0073253 | A1 * | 3/2014 | Lazaridis ............. H04L 67/34 455/41.2 |
| 2014/0107860 | A1 | 4/2014 | Bugno et al. |
| 2014/0168089 | A1 * | 6/2014 | Geaghan ............. G06F 3/0202 345/173 |
| 2014/0220937 | A1 * | 8/2014 | Kang ................. H04W 76/40 455/411 |
| 2014/0293132 | A1 * | 10/2014 | Biggs ..................... G09G 5/12 348/571 |
| 2014/0297880 | A1 * | 10/2014 | Eason .................... G06F 3/14 709/228 |
| 2014/0368664 | A1 * | 12/2014 | Yagcioglu ............. G01S 5/163 348/169 |
| 2015/0067536 | A1 * | 3/2015 | Leorin ................ H04W 12/06 715/753 |
| 2015/0071544 | A1 * | 3/2015 | Ito ..................... G06K 9/00442 382/188 |
| 2015/0140930 | A1 * | 5/2015 | Chen ................... H04W 76/10 455/41.1 |
| 2015/0201025 | A1 * | 7/2015 | Judge .................. H04L 67/141 715/735 |
| 2015/0223013 | A1 * | 8/2015 | Park ..................... H04W 8/02 455/41.2 |
| 2015/0312705 | A1 * | 10/2015 | Pan .................... H04M 1/7253 455/41.2 |
| 2015/0341217 | A1 * | 11/2015 | Guerrero ............ H04L 41/0816 709/221 |
| 2015/0348253 | A1 * | 12/2015 | Bendall ............. H04N 5/23293 348/86 |

FOREIGN PATENT DOCUMENTS

| | | | |
|---|---|---|---|
| CN | 102883134 | | 1/2013 |
| CN | 102714780 B | * | 7/2015 |
| CN | 104903830 | | 9/2015 |
| CN | 104620552 | | 8/2018 |

* cited by examiner

CALIBRATION DATA TRANSMISSIONS

An electronic device, such as a digital pen, may undergo a calibration operation with another electronic device, such as a display device, before the electronic device can be used with the other electronic device.

BRIEF DESCRIPTION OF THE DRAWINGS

Some examples of the present application are described with respect to the following figures.

DETAILED DESCRIPTION

When an electronic device undergoes a calibration operation, calibration data may be generated. The calibration data may be used by another electronic device during operation so that the two electronic devices can operate properly together. For example, a digital pen may use calibration data of a display device during operation so that the movement of the digital pen on the display device can be correctly captured by a computing device paired with the digital pen or by the digital pen. However, when the digital pen is to be used on another display device, the digital pen may need to perform another calibration operation with the other display device. Thus, the transition between the two display devices may be time consuming.

Examples described herein provide a computing device to exchange calibration data of one or more electronic devices with another computing device. In an example, a computing device includes a storage device to store calibration data of an electronic device coupled to the computing device. The computing device also includes a network interface to establish a network connection with a second computing device. The computing device further includes a processor to automatically transmit, via the network connection, the calibration data to the second computing device based on a location of the second computing device relative to the computing device and based on an association with second computing device via a communication session. In another example, the computing device also receives calibration data of a second electronic device coupled to the second computing device from the second computing device. Thus, the time an electronic device takes to transition between multiple electronic devices may be reduced.

Figure 1:
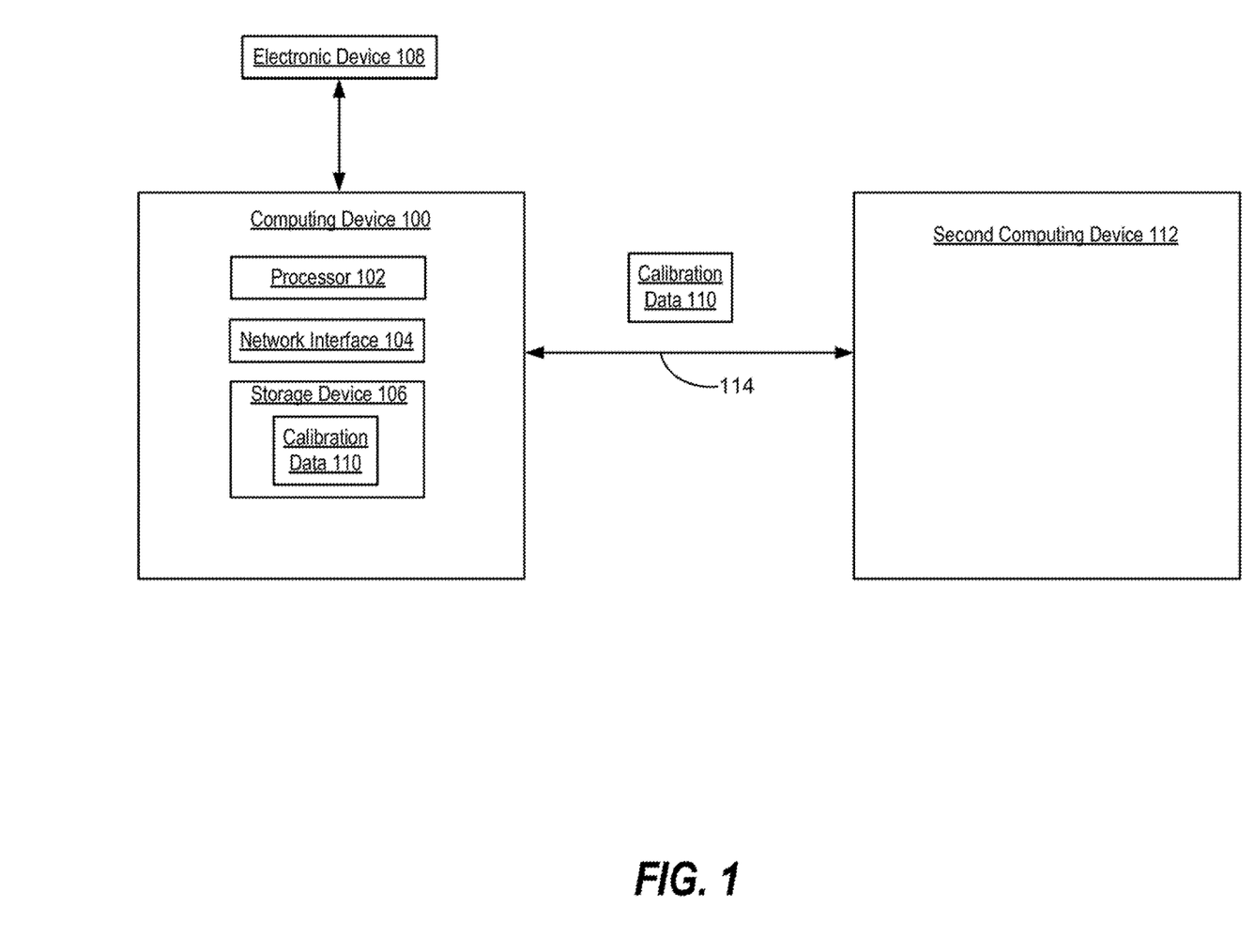
FIG. 1 illustrates a computing device to transmit calibration data of an electronic device to another computing device, according to an example.

FIG. 1 illustrates a computing device 100 to transmit calibration data of an electronic device to another computing device, according to an example. Computing device 100 may include a processor 102, a network interface 104, and a storage device 106. Computing device 100, for example, may be a notebook computer, a desktop computer, a server computer, an all-in-one computer, a tablet computing device, a mobile phone, etc.

Processor 102 may be a central processing unit (CPU), a semiconductor-based microprocessor, and/or other hardware devices suitable to control operations of computing device 100. Network interface 104 may be any electronic device or circuit suitable to transmit and receive data using a networking protocol. For example, network interface 104 may be implemented using a transceiver that is compatible with one or more networking protocols, such as the Institute of Electrical and Electronics Engineers (IEEE) 802.11 protocols, IEEE 802.3 protocols, etc. Storage device 106 may be any electronic device or circuit suitable to store data. For example, storage device 106 may be implemented using a hard disk drive, flash memory, random access memory, etc.

Computing device 100 may be coupled to an electronic device 108. Electronic device 108 may be any electronic device that works with computing device 100. In some examples, electronic device 108 may be a display device, such as an interactive whiteboard, a flat panel display, a touch-sensitive display, etc. In some examples, the display device may include a film layer that is encoded with coordinate information to work with a digital writing device, such as a digital pen. In some examples, electronic device 108 may be a digital writing device, such as a digital pen. In some examples, electronic device 108 may be external to computing device 100. In some examples, electronic device 108 may be integrated with computing device 100 (e.g., computing device 100 is a notebook computer and electronic device 108 is the display of the notebook computer). Electronic device 108 may be coupled to computing device 100 via a wired or wireless connection.

Computing device 100 may store calibration data 110 of electronic device 108 in storage device 106. Calibration data 110 may be generated via a calibration operation. Calibration data 110 may include operational data that facilitates the proper operation of electronic device 108. For example, when electronic device 108 is a display device with encoded coordinate information. Calibration data 110 may include mapping information between the encoded coordinates and the corresponding physical regions on the display device.

During operation, computing device 100 may establish a network connection 114 with second computing device 112 via a network switch, a network server, etc. Network connection 114 may be a wired or wireless network connection, such as an IEEE 802.11g wireless connection, an IEEE 802.3u wired connection, etc. As described in more detail in FIG. 2, based on a location of second computing device 112 relative to computing device 100 and based on an association with second computing device 112 via a communication session, computing device 100 may automatically (i.e., without input or instruction from a user of computing device 100) transmit calibration data 110 to second computing device 112 via network connection 114 so that second computing device 112 and/or an electronic device coupled to second computing device 112 may use electronic device 108.

Figure 2:
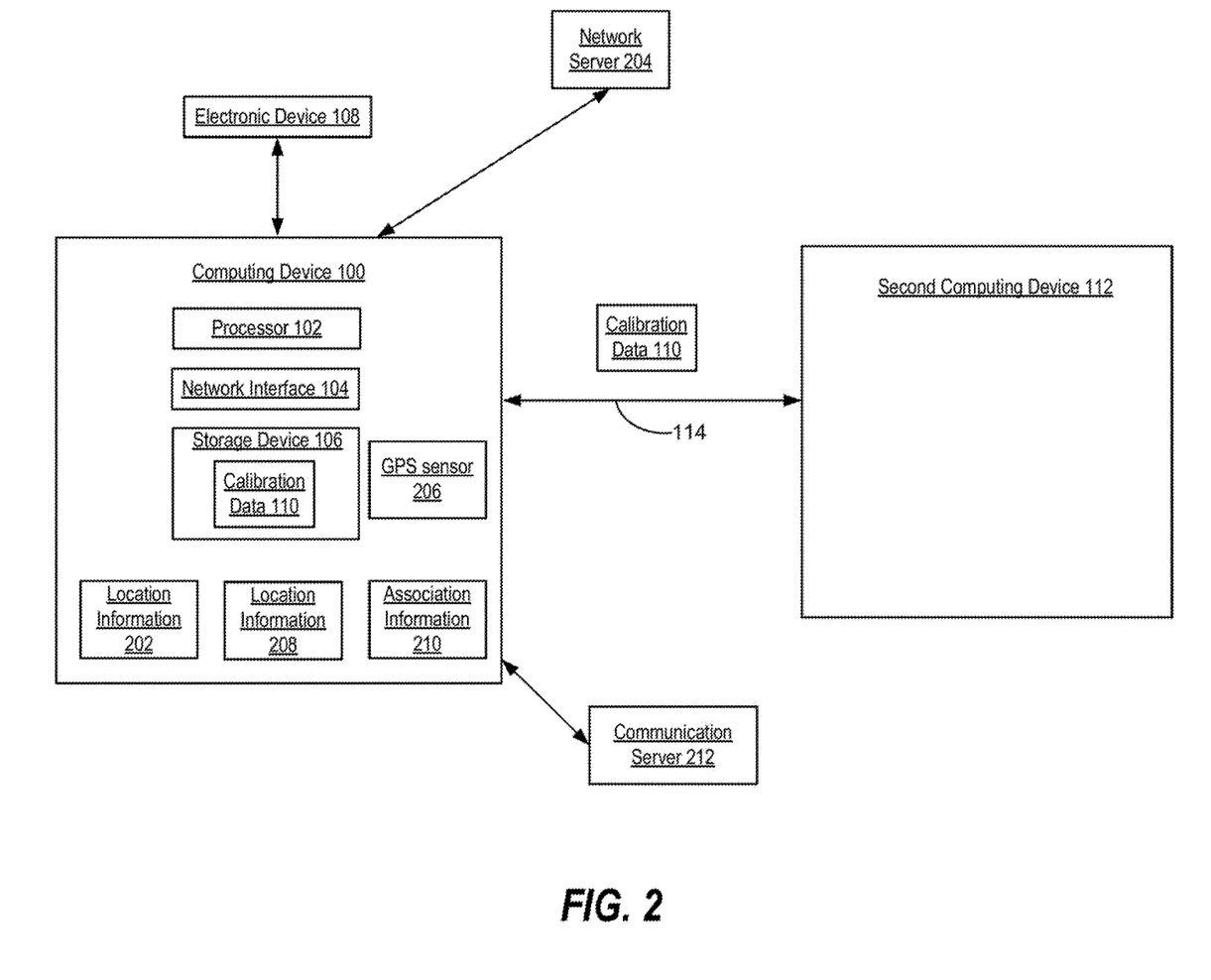
FIG. 2 illustrates a method of operation at the computing device of FIG. 1 to transmit calibration data of an electronic device to another computing device, according to an example.

Turning to FIG. 2, during operation, computing device 100 may automatically transmit calibration data 110 to second computing device 112 via network connection 114 in response to a determination that a location of second computing device 112 satisfies a location threshold and in response to a determination that computing device 100 and second computing device 112 are associated via a communication session.

Computing device 100 may determine that a location of second computing device 112 satisfies the location threshold when second computing device 112 is within a particular distance or proximity to computing device 100. For example, the location of second computing device 112 may satisfy the location threshold when computing device 100 and second computing device 112 are in the same physical location.

Computing device 100 may determine whether the location of second computing device 112 satisfies the location threshold by comparing a location of computing device 100 to the location of second computing device 112. For example, computing device 100 may have location information 202 of computing device 100 that indicates a physical location of computing device 100. For example, location information 202 may indicate that computing device 100 is located in a conference room. In some examples, location information 202 may be provided by a user of computing device 100. In some examples, location information 202 may be provided by a network server 204. In some examples, computing device 100 may determine location information 202 via a global positioning sensor 206 in computing device 100.

Computing device 100 may also have location information 208 of second computing device 112 that indicates a physical location of second computing device 112. Computing device 100 may receive location information 208 from different sources, such as second computing device 112, a user of computing device 100, network server 204, etc. Computing device 100 may compare location information 202 to location information 208 to determine whether the location of second computing device 112 satisfies the location threshold. In some examples, location information 202 and/or location information 208 may be updated periodically to indicate changes to the location of computing device 100 and/or changes to the location of second computing device 112.

Computing device 100 may determine that computing device 100 and second computing device 112 are associated via a communication session using association information 210. A communication session may include a virtual meeting, a voice over Internet protocol (VoIP) phone call, a video conferencing call, wireless screen sharing, etc.

In some examples, computing device 100 may receive association information 210 from a communication server 212 that authenticates both computing device 100 and second computing device 112 for the communication session and association information 210 may indicate that computing device 100 and second computing device 112 are both participants of the same communication session. In some examples, computing device 100 may receive association information 210 from second computing device 112 and association information 210 may indicate the communication session that second computing device 112 is, a participant of. Computing device 100 may have knowledge of a communication session that computing device 100 is a participant of. Computing device 100 may determine that computing device 100 and second computing device 112 are associated via the communication session. In some examples, association information 210 may be updated periodically to indicate any changes to the commination session, such as changes to the participants.

Thus, computing device 100 may automatically transmit calibration data 110 to second computing device 112 via network connection 114 when a location of second computing device 112 satisfies a location threshold and when computing device 100 and second computing device 112 are associated via a communication session. As described in more detail in FIG. 3, second computing device 112 may operate in a similar manner to transmit calibration data and/or other information to computing device 100 based on a location of computing device 100 relative to second computing device 112 and based on the association with computing device 100 via the communication session.

Figure 3:
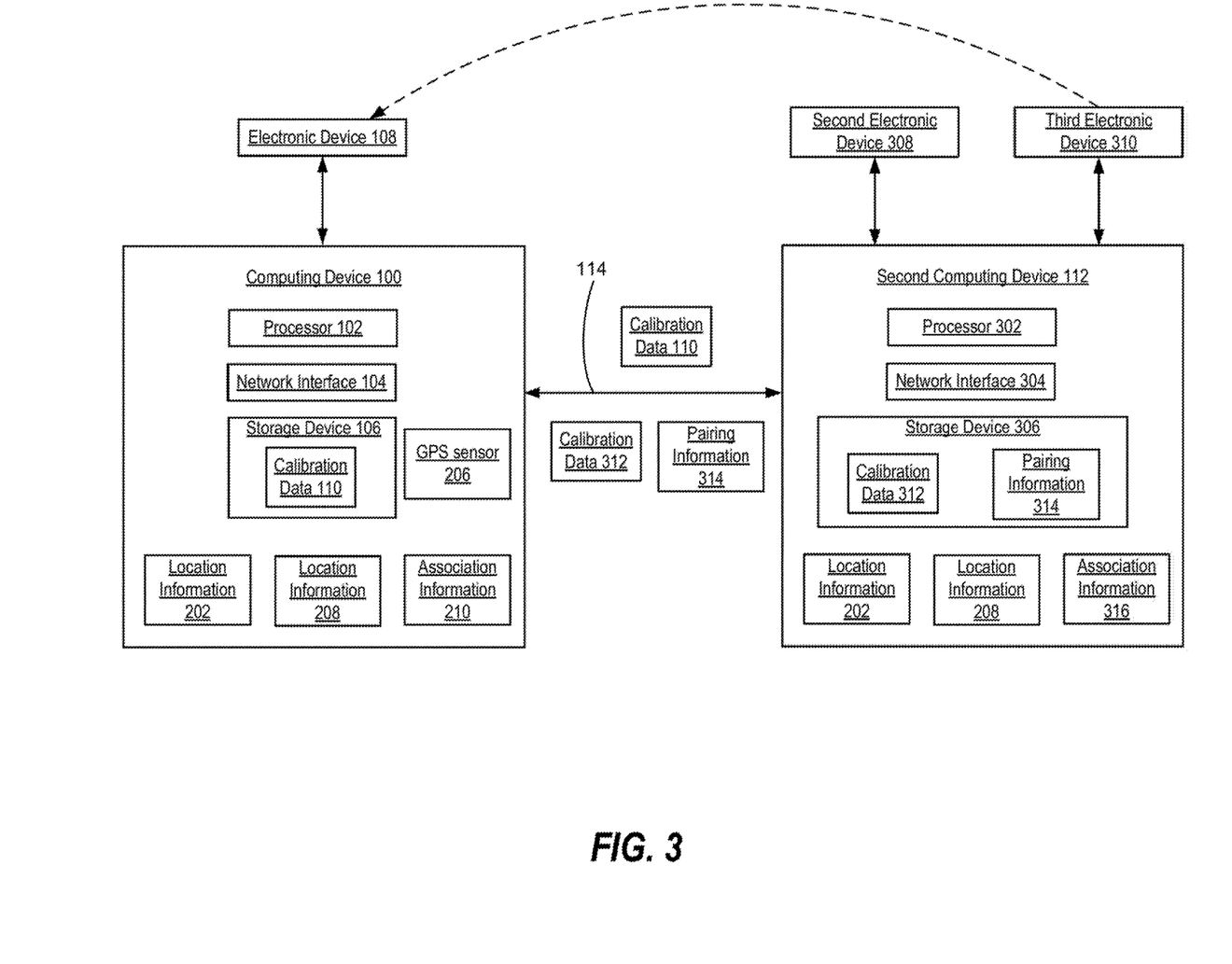
FIG. 3 illustrates a computing device to exchange calibration data and/or pairing information of electronic devices with another computing device, according to an example.

Turning to FIG. 3, second computing device 112 may include a processor 302, a network interface 304, and a storage device 306. Processor 302, network interface 304, and storage device 306 may be similar to processor 102, network interface 104, and storage device 106, respectively. Second computing device 112 may be coupled to a second electronic device 308 and a third electronic device 310. In some examples, second electronic device 308 may be similar to electronic device 108 and third electronic device 310 may be a digital writing device, such as a digital pen. Second computing device 112 may store calibration data 312 of second electronic device 308 and pairing information 314 of third electronic device 310 in storage device 306. Second computing device 112 may also store calibration data 110 received from computing device 100 in storage device 306. In some examples, second computing device 112 may transmit calibration data 110 to second electronic device 308 and/or third electronic device 310 for use by second electronic device 308 and/or third electronic device 310.

Calibration data 312 may include operational data that facilitates the proper operation of second electronic device 308. Pairing information 314 may include information about third electronic device 310 to enable second computing device 112 to establish a connection with third electronic device to exchange data. For example, pairing information 314 may enable second communication device 112 to establish a Bluetooth connection or a Wi-Fi connection.

During operation, second computing device 112 may determine whether computing device 100 satisfies a location threshold using location information 202 and location information 208 as described in FIG. 2. Second computing device 112 may also determine whether second computing device 112 is associated with computing device 100 via a communication session via association information 316. In some examples, association information 316 may indicate that computing device 100 and second computing device 112 are both participants of the same communication session. In some examples, association information 316 may indicate the communication session that second computing device 112 is a participant of. Second computing device 112 may determine whether computing device 100 and second computing device 112 are associated via a communication session in a similar manner as computing device 100 as described in FIG. 2.

Second computing device 112 may automatically transmit calibration data 312 and pairing information 314 to computing device 100 via network connection 114 when a location of computing device 100 satisfies a location threshold and when computing device 100 and second computing device 112 are associated via a communication session. Computing device 100 may store calibration data 312 and pairing information 314 received from second computing device 112 in storage device 106. Computing device 100 may transmit calibration data 312 and/or pairing By exchanging calibration data and/or pairing information of electronic devices coupled to each computing device 100 and 112, an electronic device coupled to either computing device 100 or 112 may seamlessly transition from one computing device to another computing device. As an example, during a first time period, a user of third electronic device 310, a digital writing device, may sue third electronic device 310 on second electronic device 308, a display device. Third electronic device 310 may be paired with second computing device 112 and input data provided by third electronic device 310 may be captured by second electronic device 308 and/or third electronic device 310. The input data may be transmitted to second computing device 112.

Subsequent to the first time period, the user may use third electronic device 310 on electronic device 108. Because third electronic device 310 already has calibration data 110, the user may use third electronic device 310 without a need to perform a calibration operation between third electronic device 310 and electronic device 108. When the user is to pair third electronic device 310 to computing device 100, computing device 100 may use pairing information 314 to complete a pairing operation with third electronic device. Thus, the information exchange during the pairing process may be reduced.

In some examples, each of computing device 100 and second computing device 112 may remove calibration data and/or pairing information received from the other computing device in response to detecting a change to the location of the other computing device and/or in response to detecting an end of the communication session. For example, computing device 100 may detect that second computing device 112 is at a different location than computing device 100 using location information 202 and/or 208. Thus, computing device 100 may determine that the location of second computing device 112 no longer satisfies the location threshold, computing device 100 may remove calibration data 312 and pairing information 314 from computing device 100.

As another example, when computing device 100 detects the end of the communication session using association information 210, computing device 100 may remove calibration data 312 and pairing information 314 from computing device 100. The communication session may end when computing device 100 or second computing device 112 leaves the communication session. Similarly, second computing device 112 may remove calibration data 110 from second computing device 112 in response to detecting a change to the location of computing device 100 and/or in response to detecting an end of the communication session.

Figure 4:
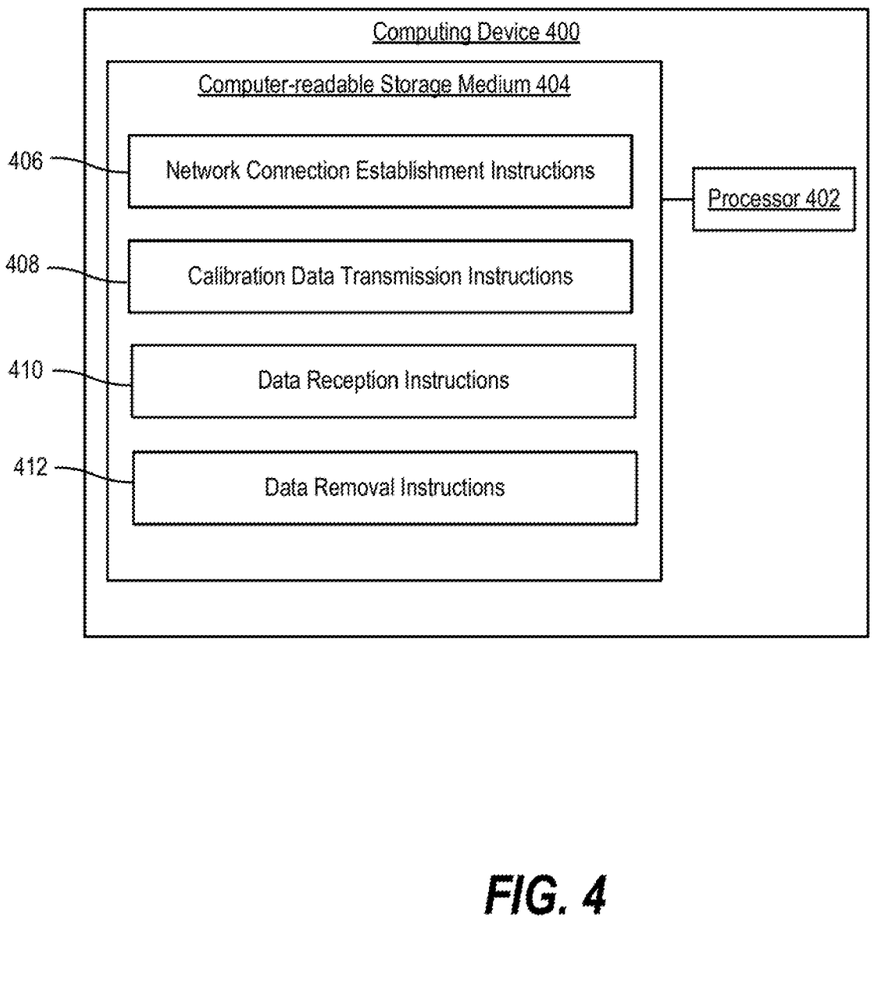
FIG. 4 illustrates a computing device to exchange calibration data of an electronic device to another computing device, according to another example.

FIG. 4 illustrates a computing device 400 to exchange calibration data of an electronic device to another computing device, according to another example. Computing device 400 may implement computing device 100 of FIGS. 1-3 and/or second computing device 112. Computing device 400 may include a processor 402 and a computer-readable storage medium 404. Processor 402 may be similar to processor 102. Computer-readable storage medium 404 may be any electronic, magnetic, optical, or other physical storage device that contains or stores executable instructions. Thus, computer-readable storage medium 404 may be, for example, Random Access Memory (RAM), an Electrically Erasable Programmable Read-Only Memory (EEPROM), a storage device, an optical disc, etc. In some examples, computer-readable storage medium 404 may be a non-transitory storage medium, where the term "non-transitory" does not encompass transitory propagating signals. Computer-readable storage medium 404 may be encoded with a series of processor executable instructions 406, 408, 410, and 412.

Network connection establishment instructions 406 may establish a network connection with another computing device. For example, referring to FIG. 1, computing device 100 may establish network connection 114 with second computing device 112 via a network switch, a network server, etc. Calibration data transmission instructions 408 may automatically transmit calibration data of an electronic device coupled to computing device 400 to another computing device. For example, referring to FIG. 1, computing device 100 may automatically transmit calibration data 110 to second computing device 112 based on a location of second computing device 112 relative to computing device 100 and based on an association with second computing device 112 via a communication session.

Data reception instructions 410 may receive data from another computing device. For example, referring to FIG. 3, second computing device 112 may also store calibration data 110 received from computing device 100 in storage device 306. As another example, referring to FIG. 3, computing device 100 may store calibration data 312 and pairing information 314 received from second computing device 112 in storage device 106. Data removal instructions 412 may remove data received from another computing device information in response to detecting a change to the location of the other computing device and/or in response to detecting an end of a communication session that associates computing device 400 with the other computing device. For example, referring to FIG. 3, computing device 100 may determine that the location of second computing device 112 no longer satisfies the location threshold, computing device 100 may remove calibration data 312 and pairing information 314 from computing device 100. As another example, when computing device 100 detects the end of the communication session using association information 210, computing device 100 may remove calibration data 312 and pairing information 314 from computing device 100.

The use of "comprising", "including" or "having" are synonymous and variations thereof herein are meant to be inclusive or open-ended and do not exclude additional unrecited elements or method steps.

What is claimed is:

1. A first computing device comprising:
    a storage device;
    a network interface to connect the first computing device to a network; and
    a processor configured to:
        generate calibration data for a digital pen device responsive to performing a calibration operation between the digital pen device and the first computing device;
        store the calibration data in the storage device such that the first computing device uses the calibration data to interpret inputs received from the digital pen device to facilitate proper operation of the digital pen device when the digital pen device is used with the first computing device;
        access first location data representing a first location of the first computing device;
        access second location data representing a second location of a second computing device connected to the network;
        compare the first location and the second location to determine that the first computing device and the second computing device satisfy a location threshold;
        determine that the first computing device and the second computing device are associated via a communication session; and
        responsive to determining that the first computing device and the second computing device satisfy the location threshold and that the first computing device and the second computing device are associated via the communication session, automatically transmit the calibration data to the second computing device, via the network, to allow the second computing device to use the calibration data to interpret inputs received from the digital pen device to facilitate proper operation of the digital pen device when the digital pen device is used with the second computing device during the communication session.

2. The first computing device of claim 1, wherein the processor is configured to automatically transmit the calibration data to the second computing device responsive to determining that the communication session comprises a virtual meeting session or a wireless screen-sharing session.

3. The first computing device of claim 1, wherein the processor is configured to determine that the first computing device and the second computing device satisfy the location threshold responsive to determining that the second computing device and the first computing device are both located in a conference room.

4. The first computing device of claim 1, wherein:
the first computing device comprises a first notebook computer or a first tablet computing device; and
the second computing device comprises a second notebook computer or a second tablet computing device.

5. The first computing device of claim 1, wherein:
the digital pen device comprises a first digital pen device;
the storage device comprises memory to store pairing information associated with a second digital pen device; and
the processor is configured to transmit the pairing information to the second computing device based on the second location and based on the communication session.

6. A first computing device comprising:
a storage device;
a network interface to connect the first computing device to a network; and
a processor configured to:
generate first calibration data for a first digital pen device responsive to performing a calibration operation between the first digital pen device and the first computing device;
store the first calibration data in the storage device such that the first computing device uses the first calibration data to interpret inputs received from the first digital pen device to facilitate proper operation of the first digital pen device when the first digital pen device is used with the first computing device;
access first location data representing a first location of the first computing device;
access second location data representing a second location of a second computing device connected to the network;
compare the first location and the second location to determine that the first computing device and the second computing device satisfy a location threshold;
determine that the first computing device and the second computing device are associated via a communication session;
responsive to determining that the first computing device and the second computing device satisfy the location threshold and that the first computing device and the second computing device are associated via the communication session, automatically transmit the first calibration data to the second computing device, via the network, to allow the second computing device to use the first calibration data to interpret inputs received from the first digital pen device to facilitate proper operation of the first digital pen device when the first digital pen device is used with the second computing device during the communication session;
receive second calibration data for a second digital pen device from the second computing device via the network; and
use the second calibration data to interpret inputs received from the second digital pen device to facilitate proper operation of the second digital pen device when the second digital pen device is used with the first computing device during the communication session.

7. The first computing device of claim 6, wherein the processor is configured to:
receive pairing data for a third digital pen device from the second computing device; and
complete a pairing operation between the first computing device and the third digital pen device using the pairing data.

8. The first computing device of claim 7, wherein the processor is configured to remove the first calibration data from the storage device responsive to determining that the first computing device and the second computing device no longer satisfy the location threshold.

9. The first computing device of claim 6, wherein:
the first computing device comprises a notebook computer; and
the second computing device comprises a tablet computing device.

10. The first computing device of claim 6, wherein the processor is configured to automatically transmit the first calibration data to the second computing device responsive to determining that the communication session comprises a virtual meeting session or a wireless screen-sharing session.

11. A non-transitory computer readable storage medium comprising instructions that, when executed, cause a processor of a first computing device to:
establish, via a network interface of the first computing device, a network connection with a second computing device;
generate first calibration data for a first digital pen device responsive to performing a calibration operation between the first digital pen device and the first computing device;
store the first calibration data in a storage device of the first computing device such that the first computing device uses the first calibration data to interpret inputs received from the first digital pen device to facilitate proper operation of the first digital pen device when the first digital pen device is used with the first computing device;
access first location data representing a first location of the first computing device;
access second location data representing a second location of the second computing device;
compare the first location and the second location to determine that the first computing device and the second computing device satisfy a location threshold;
determine that the first computing device and the second computing device are associated via a communication session;
responsive to determining that the first computing device and the second computing device satisfy the location threshold and that the first computing device and the second computing device are associated via the communication session, automatically transmit the first calibration data to the second computing device, via the network connection, to allow the second computing device to use the first calibration data to interpret inputs received from the first digital pen device to facilitate proper operation of the first digital pen device when the first digital pen device is used with the second computing device during the communication session;

receive second calibration data for a second digital pen device from the second computing device via the network connection;

store the second calibration data in the storage device;

use the second calibration data to interpret inputs received from the second digital pen device to facilitate proper operation of the second digital pen device when the second digital pen device is used with the first computing device during the communication session; and responsive to detecting that the first computing device and the second computing device no longer satisfy the location threshold or that the communication session has ended, remove the first calibration data from the storage device.

12. The non-transitory computer-readable storage medium of claim 11, wherein the instructions, when executed, further cause the processor to remove the second calibration data from the storage device responsive to determining that the second computing device and the first computing device no longer satisfy the location threshold.

13. The non-transitory computer-readable storage medium of claim 11, wherein the instructions, when executed, further cause the processor to remove the second calibration data from the storage device responsive to determining that the communication session has ended.

14. The non-transitory computer-readable storage medium of claim 11, wherein:
   the first computing device comprises a first tablet computing device; and
   the second computing device comprises a second tablet computing device.

15. The non-transitory computer-readable storage medium of claim 11, wherein the instructions, when executed, further cause the processor to automatically transmit the first calibration data to the second computing device responsive to determining that the communication session comprises a virtual meeting session or a wireless screen-sharing session.

16. The non-transitory computer-readable storage medium of claim 11, wherein:
   the first computing device comprises a display device having encoded coordinates; and
   the first calibration data comprises mapping information between the encoded coordinates and corresponding physical regions of the display device.

* * * * *